March 4, 1924.

A. J. HARTLEY

BAND CUTTER AND FEEDER

Filed Feb. 17, 1921

A. J. HARTLEY

BAND CUTTER AND FEEDER

Filed Feb. 17, 1921

Witnesses:

Inventor:
Arthur J. Hartley

March 4, 1924.

A. J. HARTLEY

BAND CUTTER AND FEEDER

Filed Feb. 17, 1921

Witnesses:
Harry R. White
W. P. Kilroy

Inventor:
Arthur J. Hartley
By
Attys

Patented Mar. 4, 1924.

1,485,848

UNITED STATES PATENT OFFICE.

ARTHUR J. HARTLEY, OF PEORIA, ILLINOIS, ASSIGNOR TO HART GRAIN WEIGHER CO., OF PEORIA, ILLINOIS, A CORPORATION OF ILLINOIS.

BAND CUTTER AND FEEDER.

Application filed February 17, 1921. Serial No. 445,660.

*To all whom it may concern:*

Be it known that I, ARTHUR J. HARTLEY, a citizen of the United States of America, residing at Peoria, in the county of Peoria and State of Illinois, have invented certain new and useful Improvements in Band Cutters and Feeders, of which the following is a specification.

This invention relates to band cutters and feeders and is designed to deliver bundles of grain to a series of band cutters, and then to feed the grain by the use of oscillating feeders to the cylinder of a thresher.

The object is in the special arrangement and mounting of the power connections for the machine, with the result that a desired speed may be transmitted through various working portions without the use of cumbersome gear wheels. Also this special mounting of the power mechanism permits the governor to be operated in the most efficient manner.

Another object is in the specially formed retarding means mounted adjacent the thresher cylinder and adjustable with relation to the condition of the grain to be fed to the thresher cylinder.

A further object is in the provision of a series of retarder knives mounted adjacent the band cutters, said knives slightly retarding the grain bundles fed thereto and by so doing permitting the band cutters to more easily sever the cording on the bundles.

A still further object is in the provision of a special trip mechanism, whereby an excessive amount of grain fed into the oscillating feeders or conveyors will automatically actuate the said trip mechanism and the action of the delivery portions of the machine will stop, permitting the oscillating members to take care of the excessive feed.

Other objects of the invention will appear in the following specification in connection with the annexed drawings, in which—

Fig. 12 is an enlarged view in detail of the special clutch mechanism;

Figure 4:
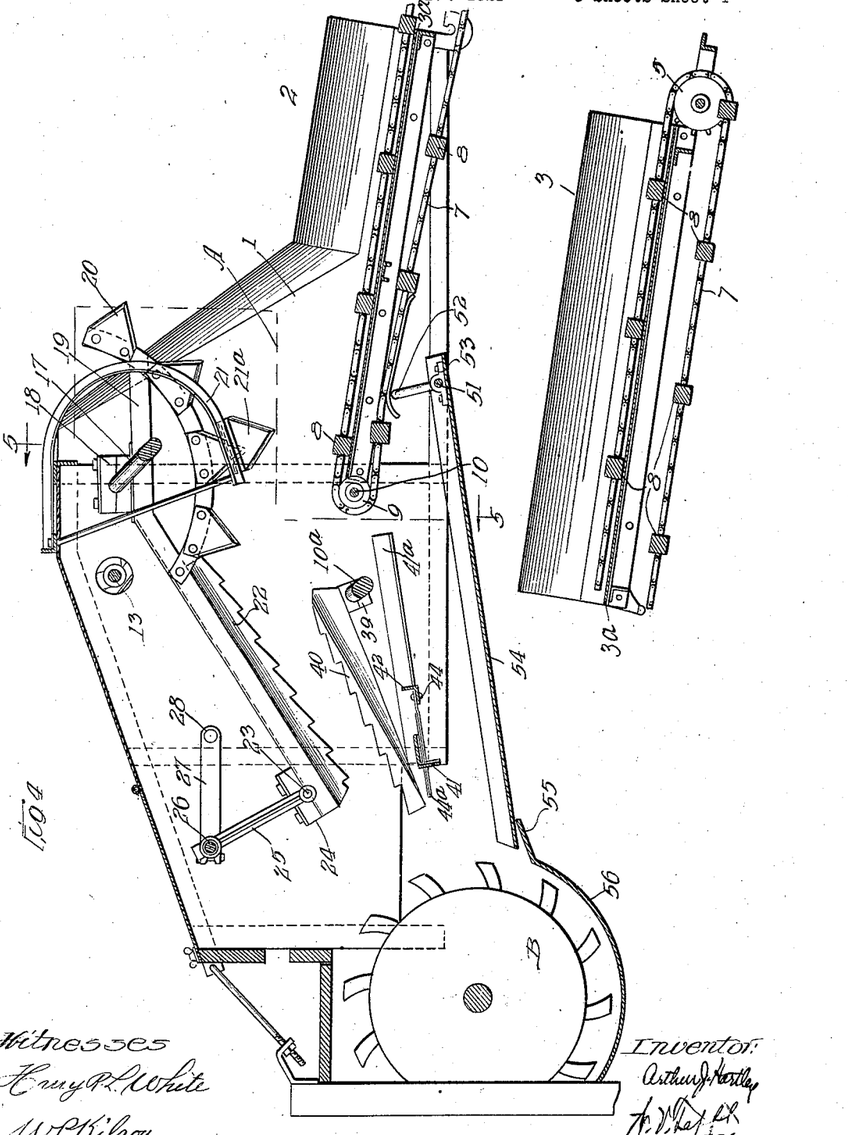
Fig. 4 is a longitudinal sectional view on the line 4—4 of Fig. 3.
Figure 5:
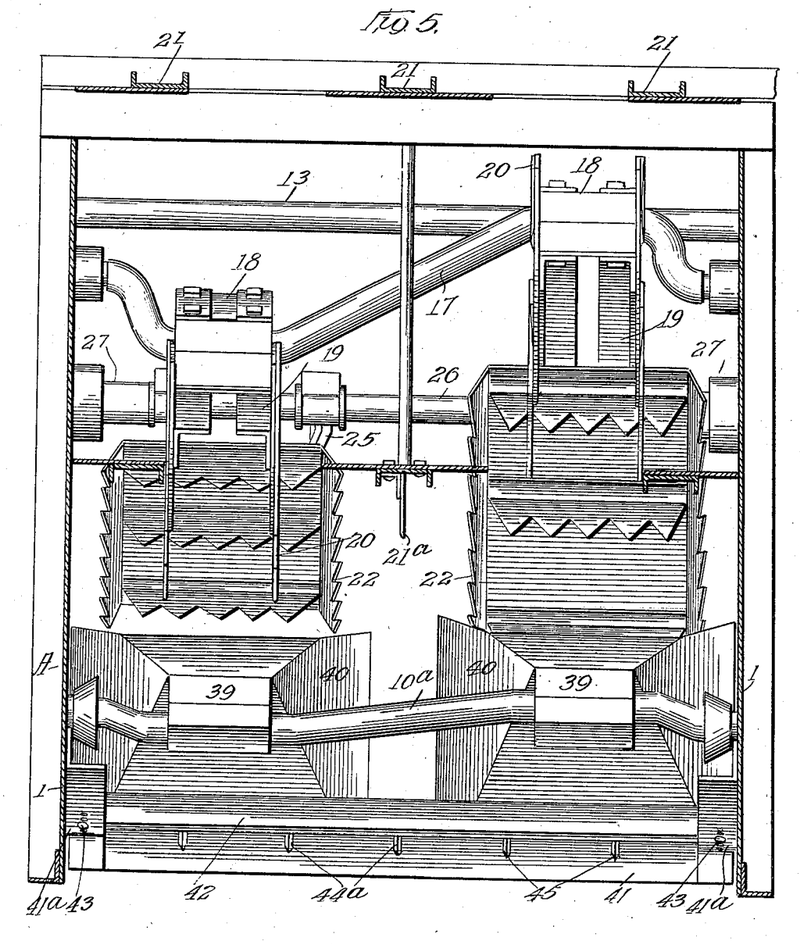
Fig. 5 is a cross-sectional view on the line 5—5 of Fig. 4.
Figures 6, 7, 8:
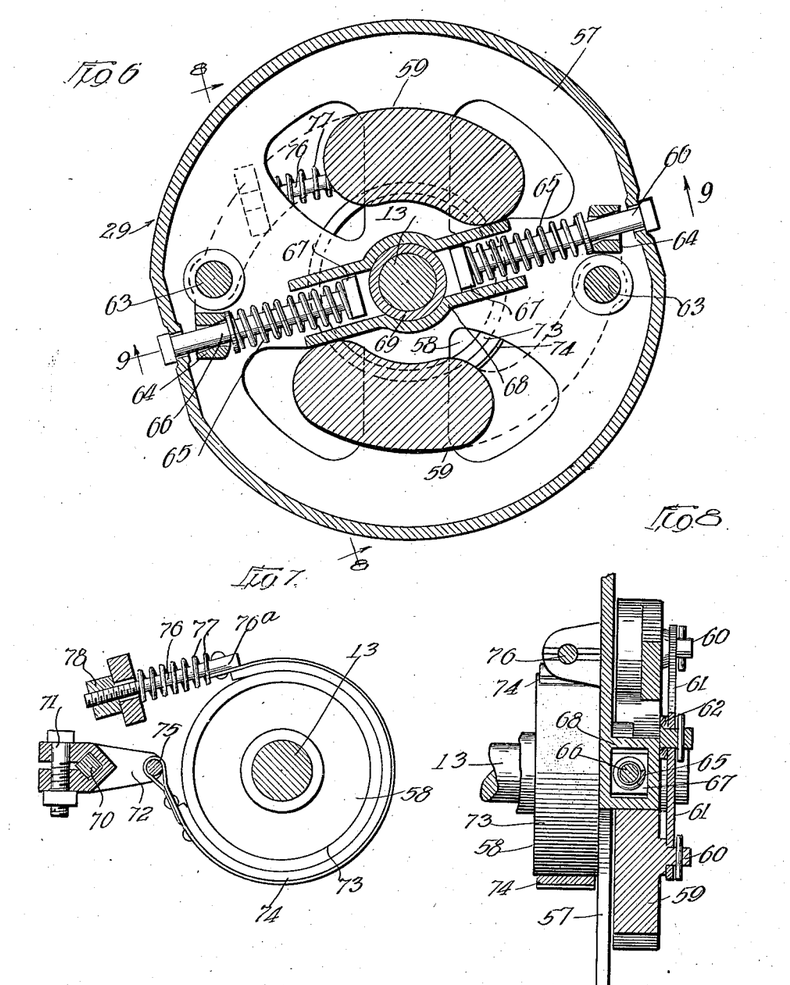
Fig. 6 is a sectional view on the line 6—6 of Fig. 3.
Fig. 7 is a view taken on the line 7—7 of Fig. 3, looking in the direction of the arrows.
Fig. 8 is a sectional view taken on the line 8—8 of Fig. 6.
Figure 9:
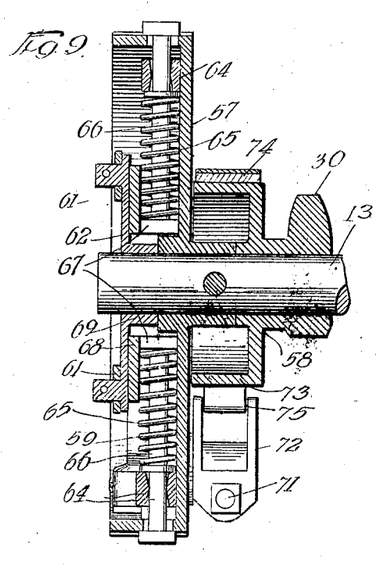
Fig. 9 is a sectional view on the line 9—9 of Fig. 6.
Figure 10:
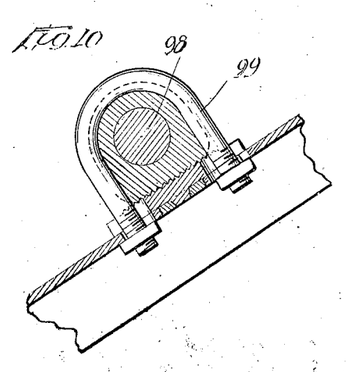
Fig. 10 is a detail view of a portion of the trip mechanism.
Figure 11:
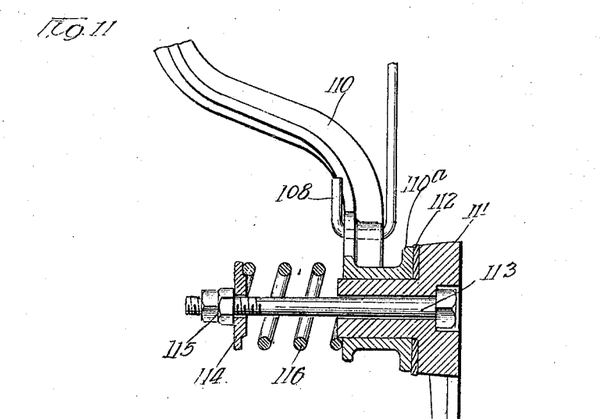
Fig. 11 is a view, partially in section, showing the manner of mounting the trip lever.
Figures 13, 15, 16:
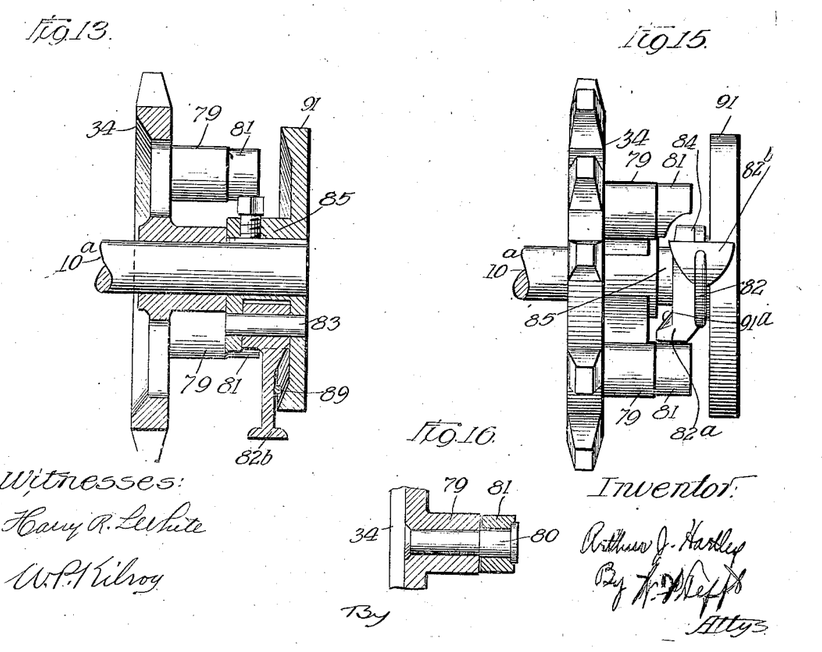
Fig. 13 is a sectional view on the line 13—13 of Fig. 12.
Fig. 15 is another perspective view, of the clutch mechanism.
Fig. 16 is an enlarged detail view of the so-called friction rollers in connection with the clutch mechanism.
Figure 14:
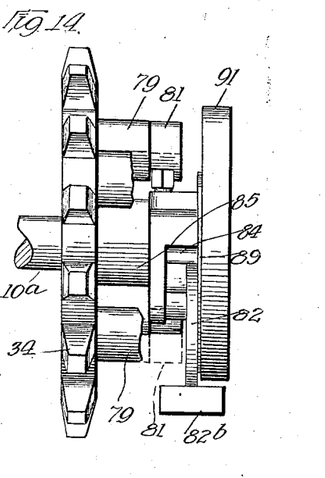
Fig. 14 is a perspective view, partly in section, of the clutch mechanism.
Figure 17:
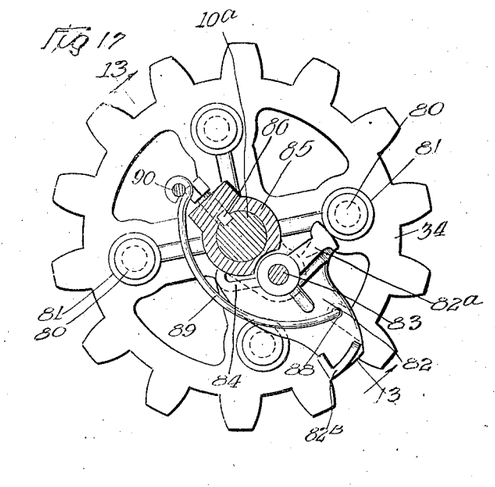
Fig. 17 is a plan view of the retarding mechanism.
Figures 17, 18, 19:
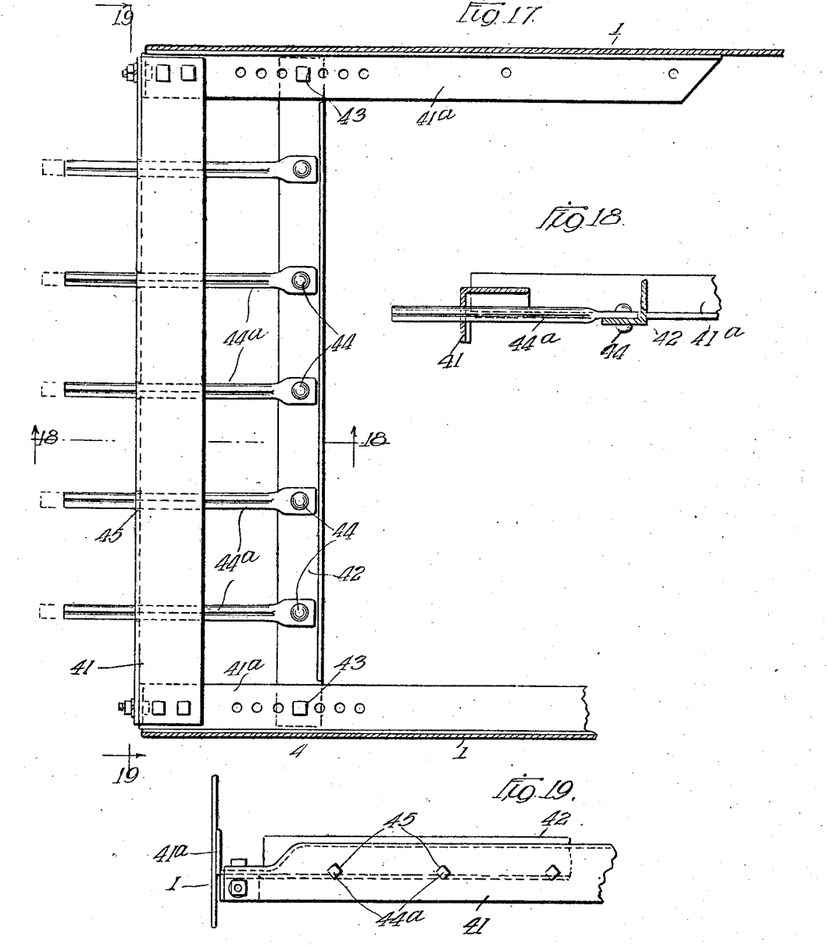
Fig. 18 is a sectional view on the line 18—18 of Fig. 17.
Fig. 19 is a view, taken on the line 19—19 of Fig. 17.

Referring to the drawings, it may be said in explanation that the band cutter and feeder are used in conjunction with a thresher, and in Fig. 4 of the drawings the machine is shown attached to the conventional thresher cylinder, the thresher itself not being shown.

Figure 1:
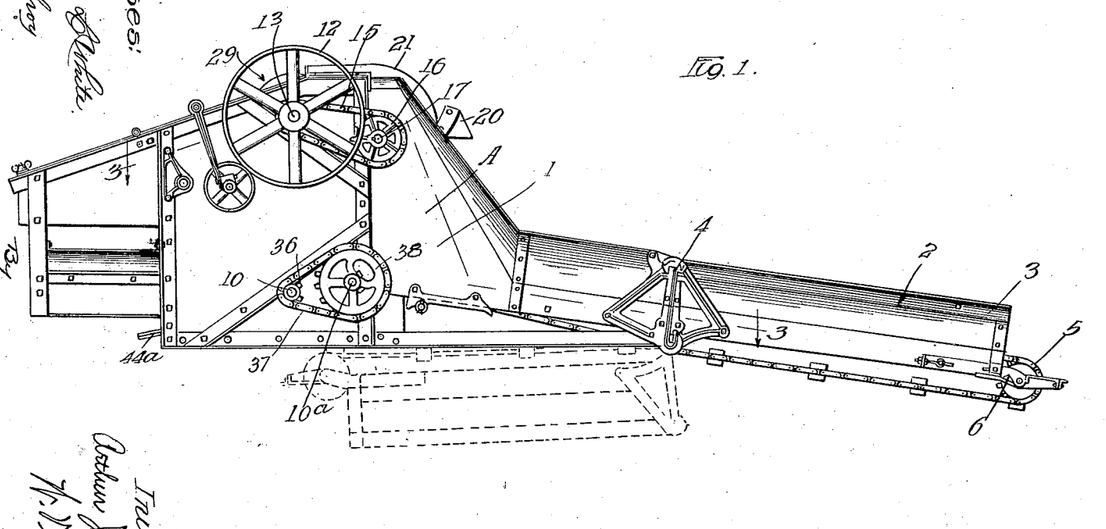
Fig. 1 is a side elevation of the machine.
Figure 2:
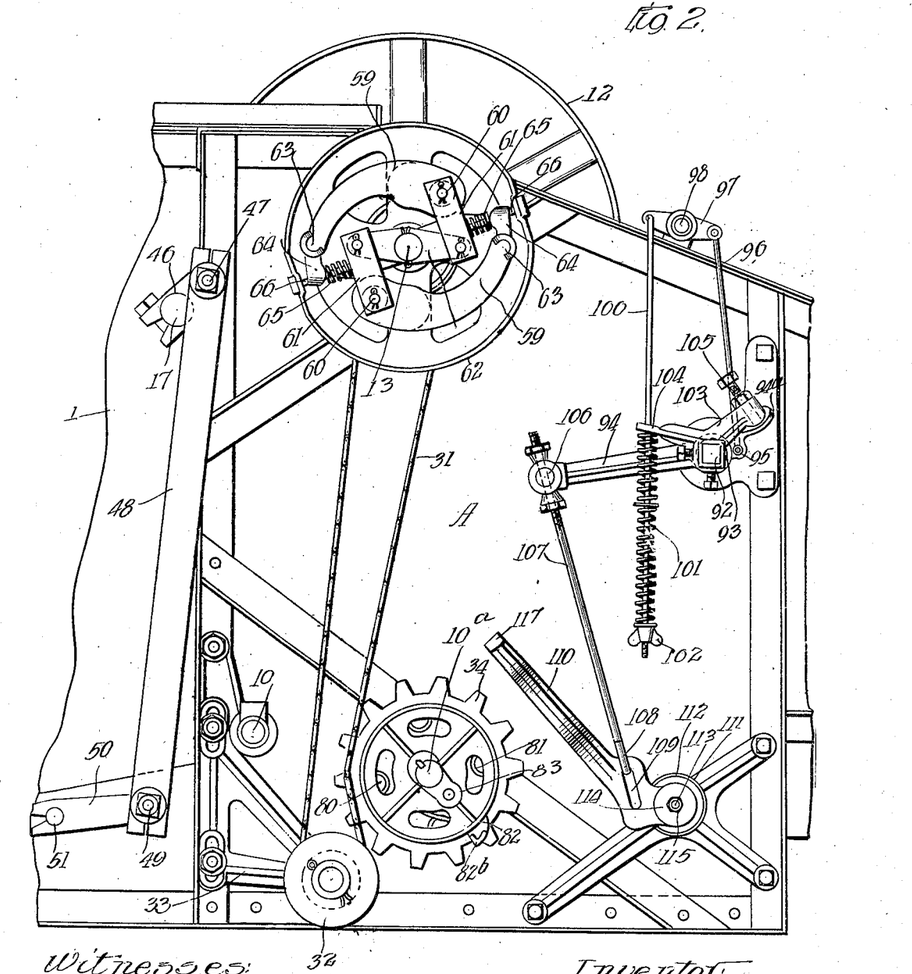
Fig. 2 is a detail side elevation of a portion of the machine showing the governor and trip mechanism.
Figure 3:
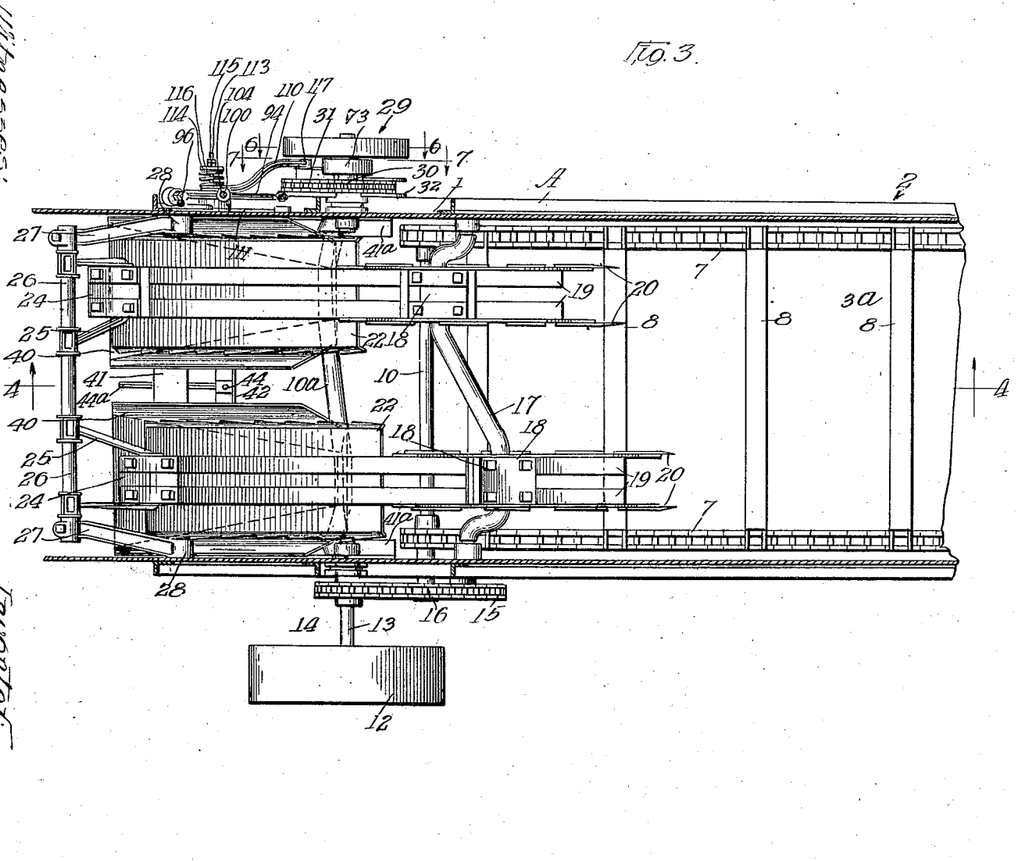
Fig. 3 is a plan view of the machine taken on the line 3—3 of Fig. 1.

A refers generally to the feeder and B to the formal mounting of the cylinder thresher. The feeder is divided into two sections, the receiving section designated at 1, and the delivery section at 2. The delivery portion has the walls 3 and bed 3ª, and a special bracket designated generally at 4 furnishes detachable connecting means between the delivery and receiving sections. This bracket described generally will furnish the subject-matter of another application. It may, however, be said that the delivery section, when it is desirable, may be swung downwardly beneath the feeder, as shown in Fig. 1 of the drawings. Idler 5 is rotatably mounted in an adjustable bracket 6 at the outer end of the delivery portion. An endless carrier having flights 8 rides beneath the delivery portion around the idler member and over the bed 3$^a$. A second and forward idler 9 for the endless carrier is mounted on the shaft 10. Power enters the machine through the power pulley 12. A sprocket wheel 14 mounted on the power shaft 13 transmits power to a crank shaft 17 through the sprocket wheel 16 and chain 15. Frames 19 are mounted on the crank shaft 17 by means of boxings 18 and band knives 20 are mounted on the forward portions of said frames.

Knife cleaning members 21 are suitably mounted adjacent said band knives and mounted upon the lower end of said cleaning members are retarder knives 21$^a$, said knives having a stationary mounting adjacent the crank operated band knives and being positioned in such a manner that the bundles of grain fed thereto by the conveyor member will be retarded slightly in their feeding movement, with the result that the crank operated band knives will be better able to sever the cords on the approaching grain bundles. These retarding knives also have the function of straightening out the bundles of grain fed thereto and form a sort of guide members.

The rear portion of the frames 19 have mounted thereon upper feed pans 22, said pans being pivotally mounted with relation to arms 25 by means of the housing 24 and bearing 23. Other arms 27 are pivotally connected as at 26 to arms 25. One of these arms has pivotal connection at its other end with the side of the thresher, and the other has a positive connection with a shaft 28 in connection with the trip mechanism to be described later. A governor is mounted on the opposite end of the power shaft 13 and is designated generally at 29, said governor, however, to be described later in detail. A sprocket wheel 30 having clutched or unclutched relation with the power shaft and mounted thereon transmits power through the chain 31 to a sprocket 34, said chain passing about an idler 32 mounted in an adjustable bracket member 33. The power sprocket 34 is mounted on the shaft 10$^a$ adjacent a clutch member designated generally as 35, to be described later in detail. Sprocket 34 has clutched or unclutched relation with the crank shaft 10$^a$, said shaft having mounted at its opposite end and at the other side of the machine a second sprocket 36, said sprocket transmitting power through the chain 37 and sprocket 38 to the shaft 10, which operates the endless carrier. Attached to the shaft 10$^a$ by means of boxes 39 are the lower feed pans 40, the outer ends of the pans sliding upon the stationary portion 41 of the retarding means, said stationary portion 41 being fixedly mounted on the end portions of the frame members 41$^a$. A base plate 42 is adjustably mounted at 43 on the frame members and attached thereto as at 44 are the retarding members 44$^a$, said retarding members projecting through suitable apertures 45 in the stationary portion 41. The above retarding mechanism is mounted adjacent the cutting blades of the thresher cylinder and as may be seen, may be adjustably mounted with relation thereto.

Positively connected to one end of the crank shaft 17 is a lever 46, which at its outer end has pivotal connection as at 47 with the lever 48, and this lever has pivotal connection as at 49 with the outer end of an arm 50 which is positively connected as at 51 with the crank shaft 52. Crank shaft 52 has mounted thereon, by means of the boxings 53, reciprocating litter pan 54. This pan extends entirely beneath the machine and catches all seepage of grain from the feed mechanism and transmits said discharge to the thresher cylinder. The outer end of the litter pan slides on the lip 55 of the concave portion 56 of the thresher.

The governor previously described generally as 29, has a housing member 57 fixedly attached as at 58 to the power shaft 13. Mounted within the housing are weights 59, said weights being pivotally connected at their weighted ends by the pivots 60, arms 61 and lever 62, said lever being fixedly mounted upon the shaft 13. The weight members have pivots 63 in connection with the governor housing, and the lighter ends of said weight members have lugs 64 formed thereon. Coil springs 65 surround rods 66, the coil springs abutting at their outer ends the lugs 64 and at their inner ends lugs 67 formed on the inner ends of the rods 66. A bracket member 58 has formed thereon cylindrical portions for the reception of the coil springs and rods above described. This bracket member is attached to a member 69 in connection with the power shaft 13. One of the pivotal connections 63 of the weight members extends through the governor housing and is positively connected to a lever 72 by the mounting 71 in connection with its squared inner end 70. A friction band 74 attached to the lever 72 as at 75 surrounds a friction drum 73 in connection with the sprocket wheel 30, said friction drum being rotatable on the shaft 13 as is the sprocket 30. The friction band has its other end attached to the rod 76 as at 76$^a$, and an adjustable mounting for said band is provided in the extension coil spring 77 and adjusting nut 78.

It may be seen from the above description that any movement of the weight members due to centrifugal force, will cause a corresponding movement to the lever 72, which will cause a clutching or unclutching relation of the friction drum 73, and therefore the sprocket 30, with the power shaft 13.

The clutching mechanism, described generally, as 35, is mounted in connection with the sprocket wheel 34, rotatably on the shaft 10 and positively driven by the chain 31. Sprocket wheel 34 has inwardly projecting lugs 79, said lugs have a core 80 projecting therefrom, and friction rollers mounted on the projecting ends of said cores. As shown in Fig. 12, the clutching mechanism consists of a clutch member 82 pivotally connected at 83, said clutch member having an inwardly projecting lug 82$^a$ capable of contact with the friction rollers 81 in connection with the sprocket wheel 34. The clutching member also has an outwardly projecting member 82$^b$ capable of contact with the trip lever of the trip mechanism to be described later. An abutment 84 on the clutch member limits the outward movement of said member. The clutch member has its pivotal mounting at 83, said mounting being formed on the bracket member 85, which is an inwardly projecting hub portion of a clutch disk 91, said disk being fixedly mounted with relation to the shaft 10 as at 86. A spring 89 is attached to the clutch member at 88, and to the outer disk at 90, said spring tending to hold the clutch member in its outermost position.

It may be seen from the above description that the clutch member, when the lug 82$^a$ is capable of contact with the friction rollers on the rotating sprocket 34, will, through its members, cause rotation of the shaft 10, and when the clutch member is thrown backward by contact of the trip lever against the lug 82$^b$, the member 82$^a$ will be held below the moving rollers and the shaft 10 thrown into unclutched relation with the rotating sprocket wheel.

While the clutch member is held in its backward position, there is a tendency, due to the rapid rotation of the sprocket wheel 34, for the lug 82$^a$ to move forward slightly and strike the friction rollers 81. Upon striking these rollers, the lug will be thrown quickly backward, thereby setting up a chattering and making rather a noisy clutch. To overcome this chattering, a spring washer, or other spring means, is mounted as at 91$^a$, between the inner portion of the clutch mechanism and the inner hub of the sprocket wheel.

The lower ends of the upper feed pans previously described, through various arms, have a pivotal mounting at one side with the side of the thresher, and at the other side are positively connected to the shaft 28, pivotally mounted in a bearing in the side of the feeder. A portion of the shaft projecting from the side of the feeder is cylindrical, as shown at 93, the outer end, however, being squared as at 92. Arm 94, having the seat 94$^a$ thereon, is mounted on the cylindrical portion 93 of the shaft 28. Connected thereto, as at 95, is the arm 96, said arm being pivotally connected to the lever 97, which is pivotally mounted on the shaft 98, said shaft being connected to the feeder frame by the U-bolts 99. A rod 100 is pivotally connected to the opposite end of the lever 97, and has encircling its lower portion the coil spring 101, the threaded nut 102 forming an adjustable tensioning means for the coil spring. A lever 103 is positively mounted on the squared end 92 of the shaft 28, said lever having one arm 104 surrounding the rod 100 and forming an upper abutment for the coil spring 101. The other arm of lever 103 has thereon an adjustable mounting 105 capable of contact with the seat 94$^a$ of the lever 94. Pivotally connected at 106 is an arm 107, said arm having at its lower end the U-shaped attachment end 108. The lower portion of the arm 107 is slidably mounted in the slot 109 in the trip lever 110, said trip lever having a semi-rigid connection with the core 111. This semi-rigid connection is obtained through the peculiar mounting of the trip lever on said core. A friction layer 112 surrounds the base portion of the core 111, and has frictional contact with the inner portion of the trip lever hub 110$^a$. Bolt 113 projects through the core 111, and has the bracket 114 adjustably mounted at its outer end, by means of the adjusting nuts 115 and coil spring 116. The inner end of the coil spring places considerable tension upon the outer hub portion of the trip lever and furnishes additional aid in the provision of a semi-rigid connection.

The trip lever 110 has projecting outwardly at its outer end the lug 117 for engagement with the projection 82$^b$ of the clutch mechanism whenever this relation is necessary.

In order to more clearly describe the invention, the operation will now be set forth: When power is transmitted to the power pulley 12, the shaft carrying the cutter knives and also affording movement to the upper feed pans, is set in motion. The governor mounted on the opposite end of the power shaft 13 does not permit the clutching mechanism in connection therewith and the sprocket wheel 30, to be set in motion until the said shaft has attained a determined speed. Inasmuch as the governor is in clutched relation with the members which drive the endless conveyor and the lower feed pans, the latter members will not be started until the power shaft 13 has attained sufficient speed to throw the clutch mechanism of the governor. In other words, bundles of grain thrown on the conveyor will not be carried to the cutter knives until said members have attained a relatively high speed. The reason for this is obvious, inasmuch as bundles of grain delivered to sluggishly acting cutting knives and feeders would result in a clogging of the machine.

The machine having attained the desired speed, the bundles of grain are carried to the cutter knives, and the encircling bands of the bundles cut by said knives and the grain fed, by the oscillating feed pans, to the threshing cylinder. However, should the amount of grain acted upon by the feed pans become excessive, the upper feed pan as described, having pivotal mounting at its lower end, will be forced upwardly and the upward movement of said pan being transmitted directly, through the previously described mechanism to the trip lever, said trip lever, should the amount of grain in the feed pans raise said pans high enough, will engage the clutch mechanism previously described and the operation of said clutch mechanism will immediately throw the conveyor mechanism and lower feed pan out of operation. This will permit the constantly oscillating upper feed pans to carry off the excessive amount of grain held between the feed pans until the upper feed pan has dropped sufficiently low to throw the trip out of engagement with the clutch mechanism.

Inasmuch as one of the objects of this invention is in the provision of a special trip mechanism, its action will be described more in detail.

As the upper feed pans are forced upwardly by an excessive amount of grain fed thereto, the shaft 28 having the trip mechanism mounted on its outer end is moved in a corresponding manner. The lever 103 fixedly mounted on the outer end of the shaft 28, through its arm 104, forces downwardly the rod 100. The spring 101 on the rod 100 is sufficiently tensioned thereon that the arm 100 will be forced downwardly before the spring will be compressed. The downward movement of the arm 100, through its related members, raises the arm 96, and thereby forces downwardly the lever 94 and rod 107. The rod 107 in its downward movement eventually acts upon the trip lever 110 and throws it into engagement with the clutch mechanism. As has been said before, the coil spring 101 is strong enough to permit the downward movement of the before mentioned arms before it is greatly compressed. However, after the trip lever has ben thrown into engagement with the clutch mechanism, and the upper feed pan still being raised by an excessive amount of grain fed thereunder, the excess movement of the lever 103 will be taken up by its arm 104 compressing the coil spring 101. Thus, it will be seen that any chance of the trip mechanism being broken by an excessive upward movement of the feed pans will be obviated by the excess movement being taken up by the compression spring.

This special mounting of the coil spring 70 with relation to the trip mechanism also assists in throwing the trip lever out of engagement with the clutch mechanism when the upper feed pans are lowered to their normal state. It will be noticed also that the adjusting means 105 permits an adjustment of the upper feed pans to take care of the different conditions of grain being operated upon.

The slot 109 in the trip lever takes up any vibration of the rod 100, with the result than any possibility of the trip lever being thrown out of engagement with the clutch mechanism is obviated.

What is claimed is:

1. In a machine of the class described, in combination, a conveyor member, crank operated frame members, crank operated band cutters mounted on the forward end of said frame members, upper oscillating feed pans mounted on the lower end of said frame members, means for yieldingly supporting the lower ends of said frames, lower oscillating feed pans, a reciprocating litter pan, retarding means, an automatic trip mechanism controlled by the movement of the upper feed pans, a clutch mechanism in connection with said trip mechanism for throwing out of operation the conveyor mechanism and lower feed pans, a power shaft, and a governor mounted on said shaft capable of controlling the initial operation of the conveyor and lower feed pans.

2. In a machine of the class described, in combination, a conveyor member, lower feed pans, crank operated frame members including thereon a series of band knives and upper feed pans, a yieldable mounting for the lower end of the frame members, direct power connection to the upper frame members, clutch mechanism controlling the operation of the conveyor and lower feed pans, and trip mechanism controlled by the movement of the upper feed pans for operating said clutch mechanism, said trip mechanism including members in direct connection with the upper feed pans, a semi-rigid trip arm having a slot therein to prevent the vibration of the feed pans being transmitted to said arm, a series of related levers connecting the trip arm to the upper feed pans, a coil spring adjustably mounted with relation to one of the levers in said series in such manner that any undue strain placed upon the trip arm may be taken up by said spring, and an adjustable mounting in the series of levers for determining the position of the upper feed pans.

3. In a device of the class described, in combination, a conveyor, a series of band cutters, upper and lower feed pans, automatic trip mechanism for operating the conveyor and lower feed pans including a semi-rigid trip lever, a series of arms connecting the trip lever and upper feed pans and an adjustable coil spring connection controlling the action of said arms.

4. In a device of the class described, a conveyor, a series of band cutters above said conveyor, feeder pans at the end of said conveyor, a frame and a retarder means, the latter including a stationary member on said frame and a base plate horizontally adjustable with relation to said frame and having retarder arms fixably attached thereto and protruding thru said stationary member.

5. In a machine of the class described, in combination, a conveyor member, lower feed pans, crank operated frame members including a series of band knives mounted on their forward ends, upper feed pans mounted on the lower ends of said frame members, a yieldable mounting for the upper feed pans, a series of stationary mounted retarder knives mounted adjacent the cutting path of said band knives, said stationary retarder knives being capable of guiding the bundles of grain fed thereto and also of retarding said grain slightly during the cutting action of the band knives.

6. In a machine of the class described, in combination, a conveyor member, oscillating upper and lower feeder elements, a series of band knives, and stationary retarder knives mounted in advance of said feeder elements, said retarder knives being adjacent the cutting path of said band knives.

7. In a machine of the class described, in combination, a conveyor member, lower feed pans, a power shaft having a power connection at one end and a governor member at the other end thereof, said governor member being capable of initially operating the conveyor member and lower feed pans, a counter crank shaft having power connections with said power shaft, frame members mounted on said counter crank shaft, a series of band knives mounted in the forward end of the frame members, upper feed pans mounted on the lower end of said frame members, and an adjustable yielding mounting for the lower end of the upper feed pans.

8. In a machine of the class described, in combination, a conveyor member, a power shaft, power connection at one end of said shaft, a governor on the other end of said shaft, a counter crank shaft having connection with said power shaft, lower feed pans, frame members having their forward ends operably attached to said counter crank shaft and their rear ends yieldably supported, a series of band knives mounted on the forward ends of said frame members, and upper feed pans attached to the lower sides thereof.

9. In a machine of the class described, in combination, a conveyor member, upper and lower feeder elements, a series of band knives, and stationary retarder knives mounted in advance of said feeder elements, said retarder knives being adjacent the cutting path of said knives.

In testimony whereof I have affixed my signature.

ARTHUR J. HARTLEY.